United States Patent [19]

Chudoba et al.

[11] Patent Number: 5,574,813
[45] Date of Patent: Nov. 12, 1996

[54] OPTICAL FIBER CONNECTOR, ABUTMENT FIXTURE AND METHOD OF COMPATIBLE USE THEREOF

[75] Inventors: Paul Chudoba, Shohola, Pa.; Michael Coppola, Binghamton, N.Y.

[73] Assignee: NuVisions International, Inc., Shohola, Pa.

[21] Appl. No.: 451,484

[22] Filed: May 26, 1995

[51] Int. Cl.[6] .................................................. G02B 6/36
[52] U.S. Cl. .............................. 385/81; 385/76; 385/77
[58] Field of Search .......................................... 385/76–87

[56] References Cited

U.S. PATENT DOCUMENTS 5,265,183  11/1993  Feng et al. ........................ 385/81 X

*Primary Examiner*—Rodney B. Bovernick
*Assistant Examiner*—Phan T. H. Palmer

*Attorney, Agent, or Firm*—Charles S. McGuire

[57] ABSTRACT

A method and apparatus for positioning the terminal end surface of a cleaved optical fiber in a predetermined plane relative to a base fiber adapter which serves to interface the fiber surface with optical test equipment, or the like. The bare fiber adapter includes a pair of gripping members having opposed surfaces of resilient material movable into and out of engagement with an end portion of the fiber. A so-called connector module at the forward end of the adapter has an axial passageway for the fiber and is configured for releasable coupling to a fixture having a polished surface which serves as an abutment or stop for the end of the fiber when it is advanced through the passageway of the adapter connector module. Versatility is provided by releasable coupling of the connector modules to the gripping portion of the adapter, thereby permitting use of a variety of interchangeable connector modules configured for cooperative engagement with various types of test equipment and the like.

24 Claims, 5 Drawing Sheets

OPTICAL FIBER CONNECTOR, ABUTMENT FIXTURE AND METHOD OF COMPATIBLE USE THEREOF

BACKGROUND OF THE INVENTION

The present invention relates to optical fiber technology, and more particularly, to an adapter for holding and connecting the end of a fiber to test equipment and to a fixture for positioning the fiber end in a desired relation to the adapter; the invention also relates to the method of cooperative use of an adapter and fixture to effect a precise positioning of the fiber end relative to the adapter. The present application incorporates material from disclosure document No. 354,125 filed May 12, 1994, retention of which is respectfully requested.

The use of optical fibers in many applications, such as transmission of coded data, requires testing of the fiber at various check points to ensure transmission integrity. Such testing requires connection of the terminal end(s) of the fiber under test to equipment such as an optical light source and optical power meter. Such test equipment is typically capable of performing very precise measurements and often, for example, in the case of optical time domain reflectometers, quite expensive. Accordingly, it is vital that the fiber under test be connected to the equipment in a manner providing the required precise positional relationships while avoiding damage to the test equipment.

Although various forms of permanent fiber connectors have been employed, extensive time and added cost is involved in their installation. A popular means of temporarily connecting a terminal end of a fiber under test to the test equipment is a device known as a bare fiber adapter. Mechanical connecting means on the bare fiber adapter are releasably affixed to compatible means on the test equipment as the end portion of the fiber under test is held in the prescribed orientation by the bare fiber adapter. This requires both a proper cleave at the terminal end of the fiber and proper positioning thereof with respect to portions of the bare fiber adapter which mate with the test equipment.

Although technology is presently available for cleaving optical fibers in a manner providing a proper end surface, there remains the problem of ensuring that the fiber end surface is positioned precisely in the desired plane, e.g., flush with the tip of the connector in the bare fiber adapter. Some prior art bare fiber adapters include a polished glass fiber stub permanently secured within the connector portion with one end flush with the tip (or other desired position) and the other end disposed for contact by the end of the fiber under test. This removes the potential of damage to the test equipment by connection thereto of the bare fiber adapter; however, it is virtually impossible to remove any dirt which may enter such adapters, which are therefore classified as non-maintainable, particularly when used in the field.

A frequently used alternative to the bare fiber adapter is the pigtail, i.e., a length of fiber having a permanent, polished surface at one end and a bare (unpolished) surface at the other end. The polished end is connected to the test apparatus and the other end connected to a coupling link or mechanical splice providing direct connection to the fiber to be tested. After the test is completed, the pigtail is re-cleaved and the process repeated. Although pigtails may be reused until they become too short, there are several disadvantages. For example, the cost per number of tests is high when relatively short pigtails are used, but the risk of damage to the pigtail fiber increases proportionately to its length and the added bulk is undesirable. Also, it is necessary to stock or transport many types of pigtails to ensure compatibility with various types of connectors, and connector loses are increased due to the additional mechanical splices.

Accordingly, it is a principal object of the present invention to provide a novel and improved method of positioning and holding a terminal end of an optical fiber at a desired position in a device for connecting the terminal end to test apparatus, or the like.

Another object is to provide a device for use with a bare fiber adapter which ensures precise positioning of the terminal end of an optical fiber in a desired plane of the adapter.

A further object is to provide a novel and improved bare fiber adapter for releasably engaging and holding an end portion of an optical fiber in a desired position.

Still another object is to provide a bare fiber adapter and a compatible stop device useable in combination to position and hold the terminal end of an optical fiber in a desired position relative to the adapter.

In a more general sense, the object of the invention is to provide improved methods and means for positioning and releasably holding an optical fiber in a precise position for optically interfacing the fiber with test apparatus, or other elements.

Other objects will in part be obvious and in part appear hereinafter.

SUMMARY OF THE INVENTION

A first aspect of the invention concerns a novel device in the nature of a fixture for releasable connection to a bare fiber adapter to provide a precision stop or abutment surface for the cleaved end of a fiber as it is inserted in the adapter. In each of two disclosed embodiments, the fixture includes three initially separate elements, connected in axial alignment to extend along a longitudinal axis between front and rear ends. An axial passageway or recess extends into the front end to receive a forwardly extending end portion of a bare fiber adapter. A highly polished surface is interposed in the passageway, normal to the axis thereof. In one embodiment, the surface is provided by the terminal end face of a short piece of optical fiber or other such material, termed a terminator, essentially duplicating the element of test equipment with which the fiber under test will be interfaced, fixedly mounted in a central portion of the passageway.

In an alternate embodiment, the surface is formed on the end of a stainless steel member. The fixture includes means for releasable coupling to the bare fiber adaptor, by threaded and frictional engagement, respectively, in the two disclosed embodiments. A removable dust cap is provided for threaded or frictional engagement with the front end of the fixture when the latter is not in use, and a tether chain may be employed to connect the dust cap to a coupling at the rear end of the fixture.

Although the fixture may be used with any bare fiber adapter to which it may be operatively coupled, the invention further provides a preferred bare fiber adapter having features which improve the interfacing of the fiber under test with the test equipment, as well as enhancing the versatility of the adapter itself. In the disclosed embodiment, the adapter includes two pivotally connected members having opposed gripping surfaces, preferably of resilient material such as foam rubber. Relative movement of the members about the pivot axis moves the gripping surfaces into and out of mutual engagement. A spring urges the members toward rotation in a direction moving the gripping surfaces into engagement. A passageway extends through one of the members and through a connector module which is releasably connected thereto. Interchangeable connector modules may be provided in a wide variety of designs tailored to the apparatus with which the fiber is to be interfaced. The position of the pivot axis relative to the gripping surfaces, and the biasing force of the spring provide a calibrated force urging the fiber extending through the passageway and gripped between the gripping surfaces in a forward direction. This effect is desirable for providing a precise interface of the bare fiber end with the test apparatus without compromising the feature of ensuring that the apparatus is not damaged in the coupling process.

In the novel method of positioning the fiber, the stop fixture and bare fiber adapter are connected by inserting the forward end of the adapter connector module into the recess in the fixture until the terminal end of the connector contacts the fixture abutment surface. The gripping surfaces of the adapter are moved apart and the fiber is moved axially through the passageway in the adapter and the connector module until the cleaved, terminal end of the fiber contacts the fixture abutment surface. The gripping surfaces are then moved together to engage the fiber therebetween. The adapter and fixture are then decoupled and the adapter is ready for coupling to test equipment or other apparatus for interfacing of the gripped fiber with another optical element.

The foregoing and other features of construction and operation of the invention will be more readily understood and fully appreciated from the following detailed description, taken in conjunction with the accompanying drawings.

DETAILED DESCRIPTION

Figure 1:
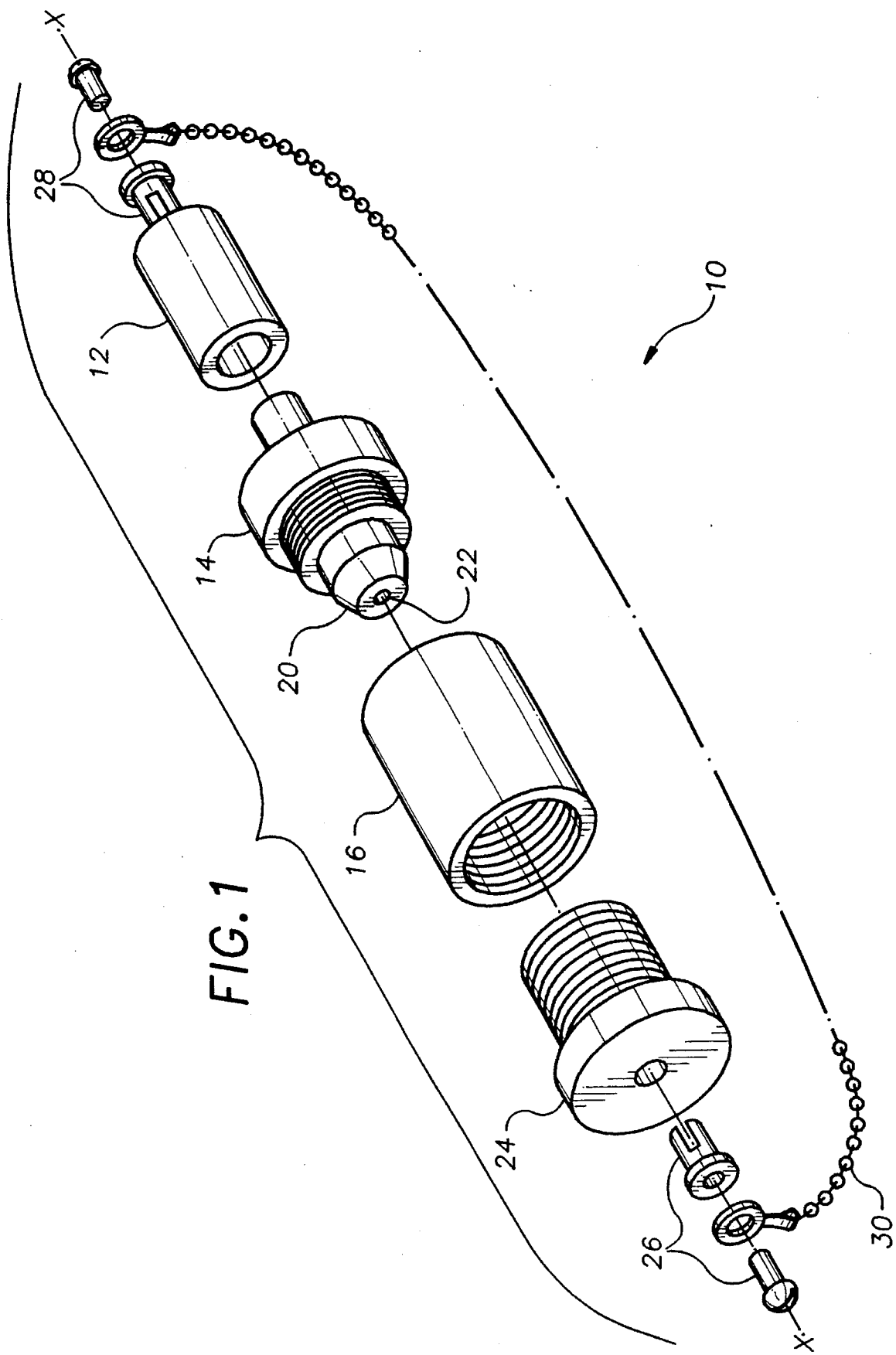
FIG. 1 is an exploded, perspective view of an exemplary construction of the precision stop fixture of the invention.
Figure 2:
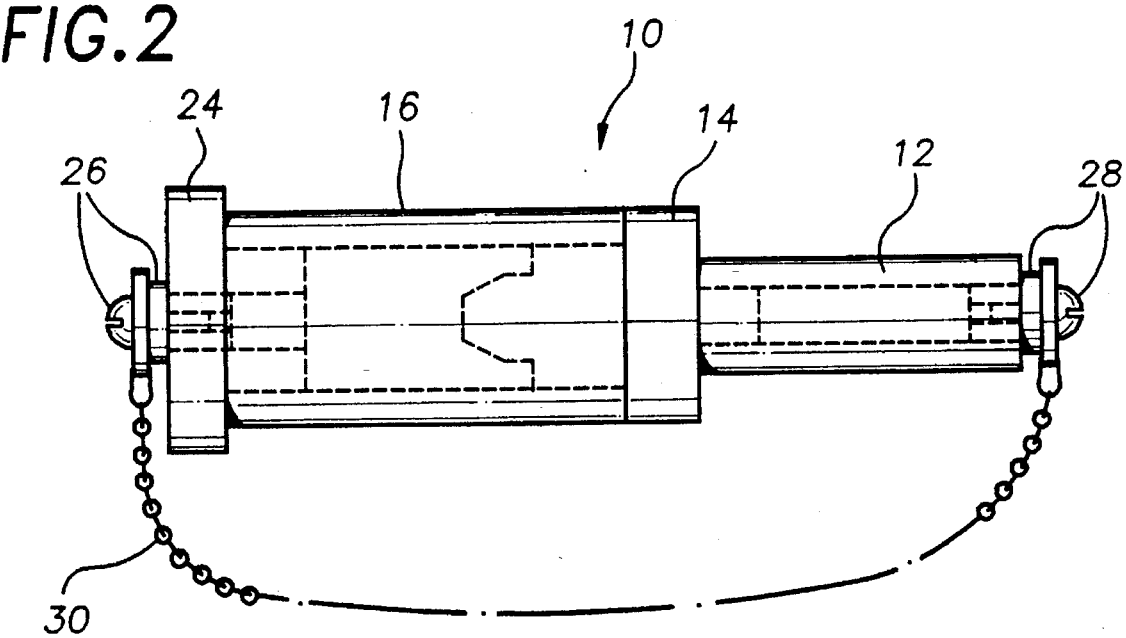
FIG. 2 is a side elevational view of the fixture of FIG. 1 in fully assembled condition.
Figure 3:
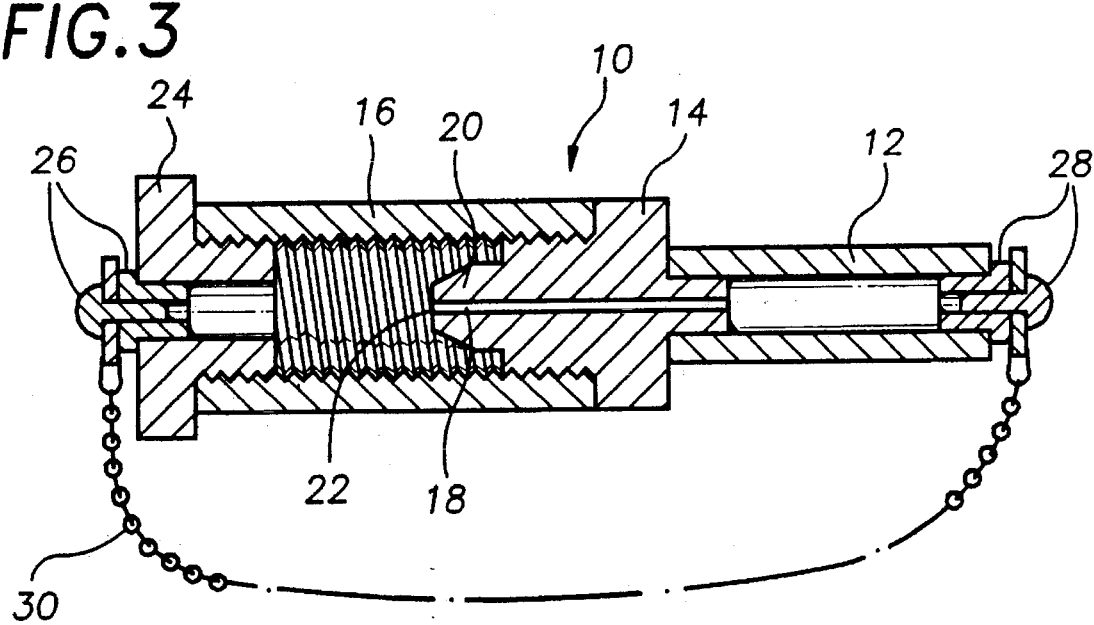
FIG. 3 is a side elevational view of the fixture in full vertical section through the center.

Referring now to the drawings, in FIGS. 1–3 is shown a precision stop fixture, denoted generally by reference numeral 10, which provides a precise positional abutment for the terminal end of an optical fiber threaded through a bare fiber adapter. Fixture 10 includes a generally cylindrical body portion consisting of three axially aligned elements, namely, barrel 12, ferrule 14, and connector 16 each having a through, axial passageway. A length of ceramic, or glass, calibrated terminator 18, simulating the optical element of a conventional piece of test equipment with which an optical fiber to be tested is interfaced, is fixedly mounted (e.g., by cementing) in the axial passageway of ferrule 14. One end of terminator 18, termed the forward end and denoted by reference numeral 20, is cut off essentially flush with the plane of the forward surface of ferrule 14, formed by an integral bead 22 surrounding the forward end of the passageway in ferrule 14. The forward surface 20 of terminator 18 is then highly polished; if necessary to ensure that the forward surface 20 of terminator 18 is coplanar with bead 22, a suitable epoxy may be applied to the forward surface of terminator 18 prior to polishing.

Elements 12, 14 and 16 are connected in aligned relation along axis X—X by threaded, press-fit, or other means. In the disclosed embodiment, barrel 12 is press-fitted on rear stub portion 23 of ferrule 14, and the forward end of ferrule 14 extends into and is threadedly engaged with the axial passageway of connector 16.

In addition to the body portion, fixture 10 includes dust cap 24 for removable, threaded engagement with the forward end of connector 16, cooperatively engaged rivets 26 at the forward end, and 28 at the rear end, and ball chain 30 having opposite end portions retained by rivets 26 and 28. As will be explained hereinafter, dust cap 24 is removed and rivets 28 remain engaged with barrel 12 when fixture 10 is in use, with chain 30 serving as a tether for dust cap 24. It will be understood that the configuration, manner of attachment, etc. of the elements may be varied somewhat, for example, to provide compatible attachment of fixture 10 with different types of bare fiber adapters, while remaining within the scope of the preferred embodiment.

Figure 4:
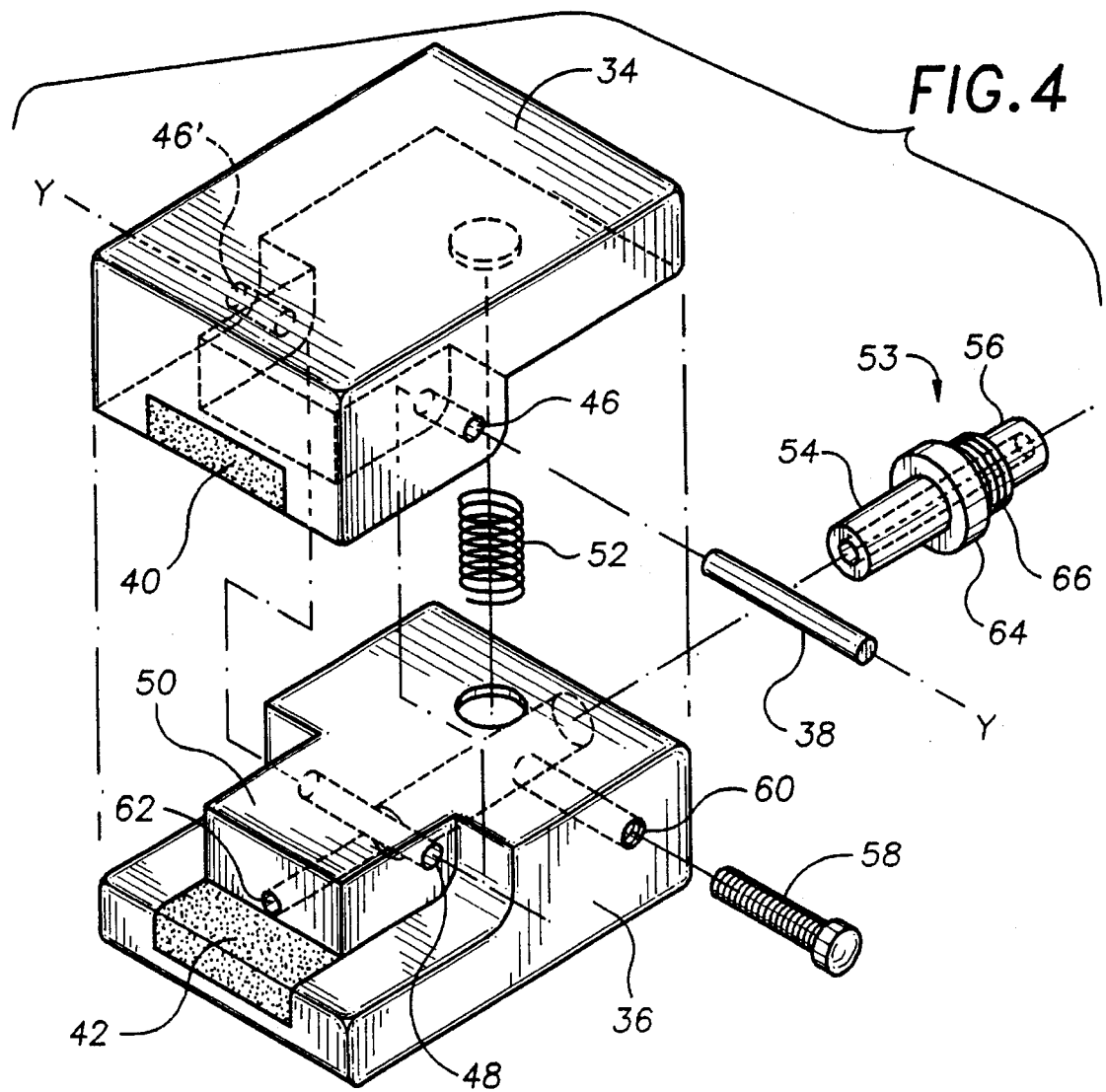
FIG. 4 is an exploded perspective view of the preferred form of bare fiber adapter for cooperative use with the fixture of FIGS. 1–3.

Fixture 10 is intended for use with any fiber terminus requiring precision alignment of the fiber end face such as a bare fiber adapter, i.e., a device used to grip an end portion of a fiber to be tested and connect it temporarily to a piece of test apparatus such as a calibrated light source, optical power meter, optical time domain reflectometer, etc. A preferred form of bare fiber adapter, denoted generally by reference numeral 32, is shown individually in FIGS. 4 and 5, and in combination with fixture 10 in FIG. 6.

Adapter 32 includes a pair of members 34 and 36 pivotally connected by pin 38 for limited relative rotation about axis Y—Y. Gripping portions 40 and 42 are incorporated in members 34 and 36 to provide opposed surfaces between which an end portion of optical fiber 44 (FIG. 6) passes. Gripping portions 40 and 42 are preferably of a resilient material, such as foam rubber, with an appreciable coefficient of friction with respect to fiber 44 for reasons explained later herein. Fiber 44, of course, represents an optical fiber which is held by adapter 32 in operative relation to other apparatus as the fiber is tested for optical integrity, or used for other applications.

Pin 38 passes through aligned openings 46, 46' in opposite sides of member 34 and through opening 48 in central portion 50 of member 36. Members 34 and 36 are relatively rotatable about axis Y—Y between the positions shown in solid and dashed lines in FIG. 5, being biased toward the solid-line position, and in spaced relation when the members are in the dashed-line position.

Figure 8:
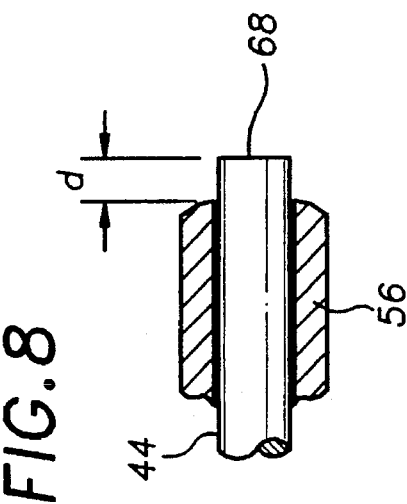
FIG. 8 is an enlarged, fragmentary, elevational view in full vertical section of a portion shown in FIG. 7 when removed from contact with another portion shown in FIG. 7.
Figure 7:
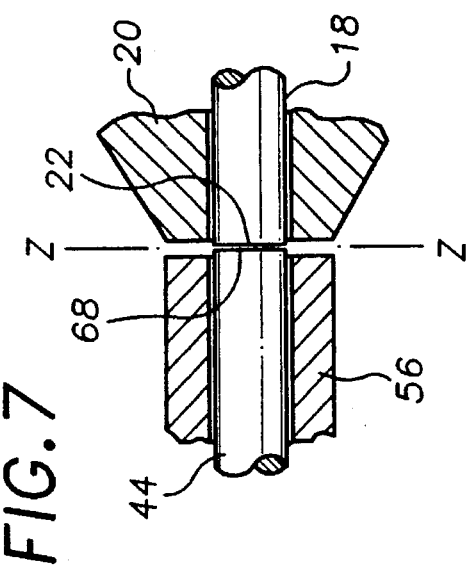
FIG. 7 is an enlarged, fragmentary, elevational view of a portion of the adapter with a fiber to be tested positioned therein.

A connector module 53 having a through, axial passageway slightly larger in diameter than fiber 44 includes rear, cylindrical portion 54 and forward portion 56. Integral, annular bead 57 (FIGS. 7, 8) surrounds the entrance to the axial passageway at the forward end thereof. Rear portion 54 fits snugly within a recess in member 36 and is releasably retained in engagement therewith by set screw 58 which is threaded into opening 60 in member 36. When so positioned, the axial passageway through tube 53 is in alignment with a passageway of like diameter in member 36, having an enlarged entrance 62 at the face of central portion 50. Collar 64, having integral, threaded portion 66, is mounted upon connector module 53 for free rotation relative thereto.

The cooperative method of operation of fixture 10 and adapter 32 will now be explained. The terminal end 68 of the bare fiber to be tested is cleaved in conventional fashion. Dust cap 24 is removed from the forward end of fixture 10, and portion 56 of adapter 32 is inserted into the open, front end of connector 16. Collar 64 is rotated to advance threaded portion 66 into connector 16, thereby firmly abutting the end of bead 57 against the coplanar surfaces of bead 22 and polished end 20 of terminator 18. The internal passageway of connector module 53 is then aligned with the axis of terminator 18 along axis X—X.

Figure 5:
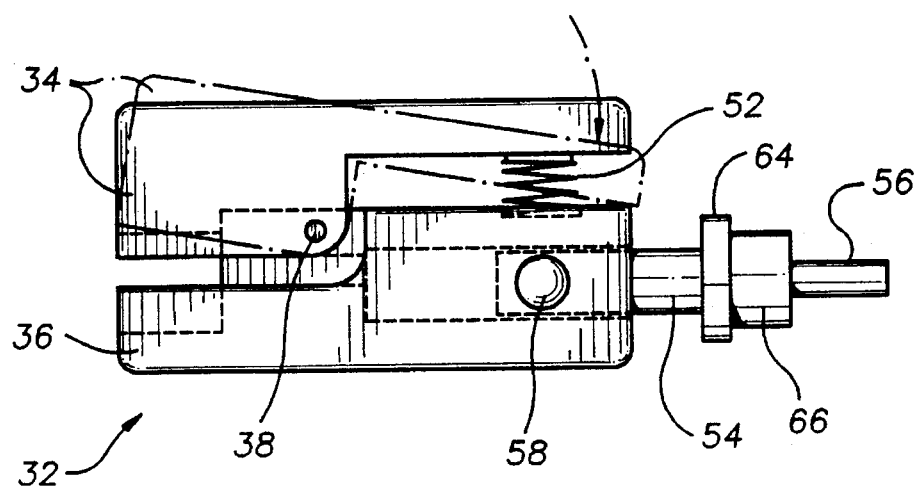
FIG. 5 is a side elevational view of the adapter of FIG. 4, in fully assembled condition, showing a movable portion thereof in solid and dotted lines in two, terminal positions.
Figure 6:
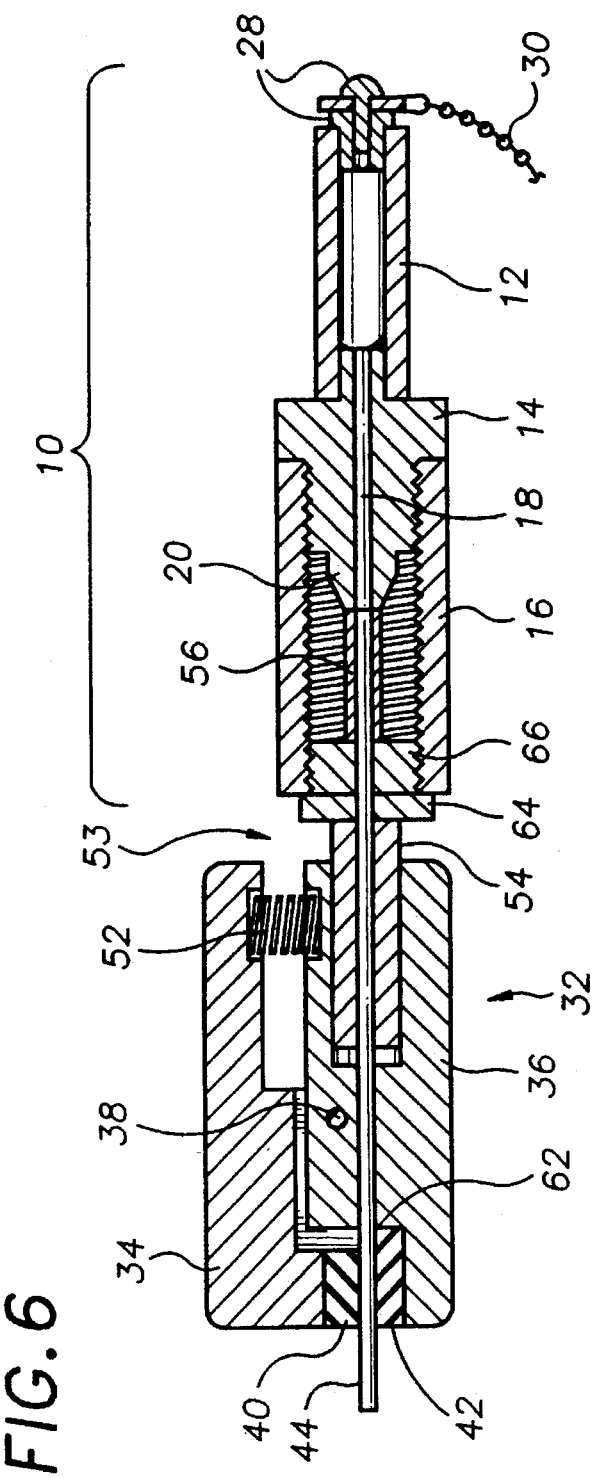
FIG. 6 is a side elevational view of the fixture and adapter, both in full vertical section through the center, in operatively coupled relation.

The operator then holds adapter 32 in one hand, moving members 34 and 36 to the dashed-line position of FIG. 5 against the bias of spring 52, and with the other hand advances the end of fiber 44 into enlarged entrance 62, and through the aligned passageways in portion 50 of member 36 and connector module 53 (i.e., along axis X-X) until the terminal end of bare fiber 44 abuts polished end 22 of terminator 18. The operator then permits spring 52 to move members 34 and 36 to the solid-line position, thereby engaging fiber 44 between the opposed surfaces of gripping portions 40 and 42. At this time, the elements are in the positions shown in FIG. 6; the terminal end of bare fiber 44 is in abutting relation with the polished end of terminator 18, all of the surfaces of the ends of fiber 44, terminator 18, bead 22 and bead 57 being coplanar in plane Z—Z as shown in the enlarged fragment of FIG. 7.

Collar 64 is then rotated to remove threaded portion 66 from engagement with connector 16, and fixture 10 is uncoupled from adapter 32. The end portion of fiber 44 continues to be engaged between the opposed surfaces of gripping portions 40 and 42, thus maintaining the positional orientation of the bare fiber to the adapter as the latter is coupled in the usual manner to a piece of equipment having compatible connection means for receiving the forward portion of connector module 53.

A further advantage realized by the present invention is the forward bias placed on bare fiber 44 while held in adapter 32. Due to the relative positioning of axes X—X and Y—Y, the opposing surfaces of gripping portions 40 and 42, and the biasing force of spring 52, a small but nevertheless significant axial force is exerted upon the end portion of bare fiber 44. Because of this axial force, upon decoupling fixture 10 and adapter 32, the terminal end of fiber 44 may extend past the end of bead 57 a small distance, indicated as dimension d in the enlarged fragment of FIG. 8. The axial force is controlled in such a manner as to accurately position the fiber. This results in a positive coplanar, glass to glass alignment of fiber 44 with the optical apparatus, thereby maximizing and optimizing coefficients of coupling.

Figure 9:
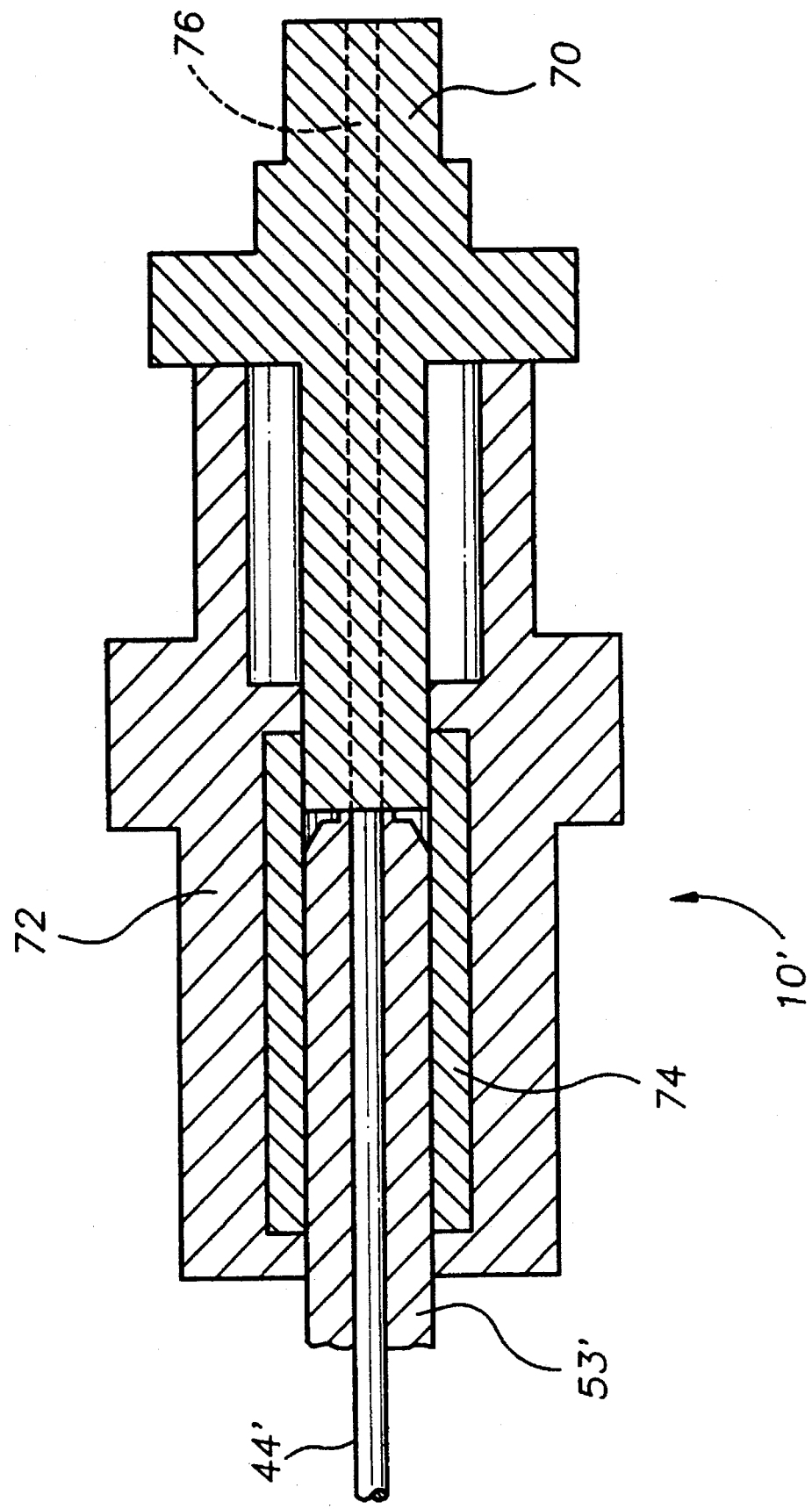
FIG. 9 is a fragmentary, side elevational view in full vertical section of another embodiment of the precision stop fixture shown coupled to a portion of the adapter.

Referring now to FIG. 9, an alternate construction of fixture 10, denoted by reference numeral 10' is shown. Ferrule 70 extends into an axial bore in body portion 72. The forward end of ferrule 70 is received in the rear end of and frictionally engaged by split spring bushing 74 which is positioned in a recess within body portion 72. Ferrule 70 may be of a material such as zirconia having an axial passageway in which terminator 18' is positioned. Alternatively, ferrule 70 may be of a material such as stainless steel with a flat, highly polished front surface, and the terminator omitted. The forward portion of the bare fiber adapter connector module, denoted by reference numeral 53' is inserted into the forward end of spring bushing 74 and frictionally gripped thereby to provide precise centering. The cleaved end of fiber 44' is advanced through the passageway of connector module 53' and seated against the abutment surface as in the previously described embodiment.

From the foregoing, it will be seen that the invention provides a fast, simple and reliable solution to the problem of connecting a cleaved bare fiber to optical equipment without danger of damage to the equipment. The end of the bare fiber is precisely aligned with the end of the adapter by which it is held with the unique adapter structure providing a desirable axial biasing force on the fiber. It should be noted that, upon connection of the adapter to optical equipment, the terminal end surface of the fiber under test will again be flush with the surrounding end surface of the connector module, any small increment of axial movement of the fiber being accommodated by the resilient nature of the fiber gripping portions. In any event, the axial bias applied to the fiber under test assures the desired, precise interfacing of the bare fiber with the associated equipment. Furthermore, the resilient nature of the gripping portions eliminates the possibility of distortion or other damage to the fiber. Both the adapter and the cooperative fixture used therewith to provide a precision stop means may easily be cleaned and reused countless times. The use of a releasably coupled connector module in the bare fiber adapter enhances versatility of the unit; i.e., only the connector module need be changed to make the adapter compatible with various types of optical equipment.

What is claimed is:

1. The method of positioning and releasably holding an end portion of an optical fiber in a first fixture having a first passageway with a first, linear axis for passage of said end portion and gripping means selectively movable into and out of engagement with said end portion to position the terminal end surface of said end portion in a first plane perpendicular to the axis of said first passageway, said method comprising:

a) providing a second fixture having a second passageway with a second linear axis;

b) positioning within said second passageway in a second plane perpendicular to said second axis a flat, polished abutment surface;

c) releasably connecting said second fixture to said first fixture with said first and second axes aligned and said first and second planes substantially coplanar;

d) moving said first optical fiber axially through said first passageway with said gripping means out of engagement with said end portion until said terminal end surface abuts said abutment surface;

e) moving said gripping means into frictional engagement with said end portion; and e) disconnecting said second fixture from said first fixture.

2. The method of claim 1 wherein said gripping means are moved manually into and out of engagement with said end portion.

3. The method of claim 2 wherein said gripping means includes a pair of members pivotally connected to one another for relative movement about a pivot axis and said step of moving said gripping means into engagement with said end portion applies an axial biasing force to said end portion.

4. The method of claim 1 wherein said first and second fixtures include respective, compatible, threaded engagement means and said connecting and disconnecting steps comprise moving said engagement means into and out of mutual threaded engagement.

5. The method of claim 1 wherein said first and second fixtures include respective, compatible, frictional engagement means and said connecting and disconnecting steps comprise moving said engagement means into and out of mutual frictional engagement.

6. The method of claim 1 wherein said abutment surface simulates the surface of an optical element of apparatus with which said terminal end surface is to be interfaced.

7. A fixture for releasable attachment to a bare fiber adapter to define stop means for positioning the cleaved, terminal end of an optical fiber in predetermined plane relative to said adapter, said fixture comprising:
   a) a body portion extending along a longitudinal axis between opposite ends;
   b) an open-ended passageway extending axially of said body portion;
   c) an optically polished abutment surface positioned within said passageway perpendicular to the axis thereof, said polished surface comprising a terminal end surface of an element simulating an optical element of apparatus with which said cleaved end is to be interfaced; and
   d) connector means for cooperative engagement with said bare fiber adapter with said polished surface substantially at said predetermined plane, whereby positioning said cleaved end in abutting relation to said polished surface places said cleaved end in said predetermined plane.

8. The fixture of claim 7 wherein said body portion comprises a plurality of initially separate parts.

9. The fixture of claim 8 wherein one of said parts is a split spring bushing.

10. The fixture of claim 9 wherein said bushing is positioned symmetrically about said passageway axis.

11. A fixture for releasable attachment to a bare fiber adapter to define stop means for positioning the cleaved, terminal end of an optical fiber in predetermined plane relative to said adapter, said fixture comprising:
   a) a body portion extending along a longitudinal axis between opposite ends;
   b) an open-ended passageway extending axially of said body portion;
   c) an optically polished abutment surface positioned within said passageway perpendicular to the axis thereof; and
   d) connector means for cooperative engagement with said bare fiber adapter with said polished surface substantially at said predetermined plane, whereby positioning said cleaved end in abutting relation to said polished surface places said cleaved end in said predetermined plane; and
   e) a protective end cap selectively positionable in and out of covering relation to the open end of said passageway.

12. A bare fiber adapter for frictionally engaging an end portion of an optical fiber to position the terminal end surface of said fiber in a predetermined plane when said adapter is releasably coupled to other apparatus, said adapter comprising:
   a) a pair of members, each having a gripping surface;
   b) means connecting said members for movement of said gripping surfaces between a first position, wherein said gripping surfaces frictionally engage therebetween said fiber at a position rearwardly of said end surface, and a second position, wherein said gripping surfaces are spaced apart by a distance greater than the diameter of said fiber;
   c) means defining a passageway having a linear axis and a cross section slightly larger than said fiber diameter and positioned between said gripping surfaces and said predetermined plane; and
   d) means for releasably coupling said passageway defining means to at least one of said members.

13. The adapter of claim 12 wherein said passageway defining means comprises a tubular member elongated along said linear axis and having a rear end portion releasably coupled to one of said members and a forward end portion having a terminal end positioned substantially in said predetermined plane.

14. The adapter of claim 13 wherein said one of said members includes a recess and said rear end portion is slidably received in said recess.

15. The adapter of claim 14 and further including means for frictionally retaining said rear end portion in said recess.

16. The adapter of claim 13 and further including a fixture having means defining a planar abutment surface, and means for releasably coupling said fixture to said adapter with said abutment surface substantially coplanar with said predetermined plane.

17. The adapter of claim 16 and further including means for threaded engagement of said adapter with said fixture.

18. The adapter of claim 16 and further including means for frictional engagement of said adapter with said fixture.

19. The adapter of claim 12 wherein said gripping surfaces are respective surfaces of a pair of resilient elements.

20. The adapter of claim 12 wherein said resilient elements are of foam rubber-like material.

21. The adapter of claim 20 wherein said gripping surfaces are substantially planar.

22. The adapter of claim 12 wherein said members are pivotally connected to one another for relative movement about a pivot axis perpendicular to said linear axis.

23. The adapter of claim 22 and further including spring means biasing said members toward movement to said first position.

24. The adapter of claim 23 wherein said gripping surfaces and said spring means are positioned on opposite sides of said pivot axis.

* * * * *